United States Patent
Dowsett

(10) Patent No.: US 8,083,939 B2
(45) Date of Patent: Dec. 27, 2011

(54) SCREEN NOZZLE

(75) Inventor: Murray Frank Dowsett, Bardon (AU)

(73) Assignee: Weatherford Australia Pty Limited, Malaga, Western Australia (AU)

( * ) Notice: Subject to any disclaimer, the term of this patent is extended or adjusted under 35 U.S.C. 154(b) by 998 days.

(21) Appl. No.: 10/595,263

(22) PCT Filed: Sep. 10, 2004

(86) PCT No.: PCT/AU2004/001230
§ 371 (c)(1),
(2), (4) Date: May 21, 2008

(87) PCT Pub. No.: WO2005/032691
PCT Pub. Date: Apr. 14, 2005

(65) Prior Publication Data
US 2008/0230460 A1 Sep. 25, 2008

(30) Foreign Application Priority Data
Oct. 3, 2003 (AU) .............................. 2003905443

(51) Int. Cl.
*B01D 29/15* (2006.01)
(52) U.S. Cl. ............... 210/232; 210/259; 210/416.1
(58) Field of Classification Search ............... 210/232, 210/416.1, 459, 460, 462, 463
See application file for complete search history.

(56) References Cited

U.S. PATENT DOCUMENTS

| | | | |
|---|---|---|---|
| 2,779,478 A * | 1/1957 | Wahlin | 210/232 |
| 4,390,478 A * | 6/1983 | Sheperd | 261/6 |
| 5,985,142 A * | 11/1999 | Belden | 210/232 |
| 6,165,357 A * | 12/2000 | Cormier | 210/163 |
| 6,332,545 B1 | 12/2001 | Izumi | |
| 6,579,458 B2 | 6/2003 | Mickelat et al. | |
| 7,501,058 B1 * | 3/2009 | Lawrence, Sr. | 210/232 |

FOREIGN PATENT DOCUMENTS

| | | |
|---|---|---|
| CA | 2 391 853 | 7/2003 |
| EP | 1 161 977 | 12/2001 |
| JP | 2003-275527 A * | 9/2003 |

OTHER PUBLICATIONS

International Search Report, Application No. PCT/AU2004/001230, Dated Oct. 19, 2004.

\* cited by examiner

*Primary Examiner* — Fred Prince
(74) *Attorney, Agent, or Firm* — Patterson & Sheridan, L.L.P.

(57) ABSTRACT

A screen nozzle for a media retention screen is disclosed which includes a nipple, a bottom cover, a top cover, and a cylindrical screen element sandwiched between the top and bottom covers. The top cover is secured to the bottom cover by means of a threaded rod extending from either the bottom cover or the nipple through the interior of the screen through an aperture in the top cover with the top cover being retained in place by a nut or the like. The nipple is secured to the bottom cover by swaging and the threaded rod is welded to the bottom cover. Assembling the screen element using an internal threaded rod has two substantial advantages over existing screen nozzles. The first advantage is that there are no external welds which may damage or deform or foul the screen and which are also are potential areas of weaknesses which may be subject to corrosion. Secondly the screen element may be replaced without removing the nozzle from the screen plate. This makes repair and replacement of the screen nozzles considerably easier and also cheaper, since the nipple itself does not need to be replaced.

15 Claims, 1 Drawing Sheet

SCREEN NOZZLE

FIELD OF THE INVENTION

This invention relates to an improved screen nozzle.

BACKGROUND OF THE INVENTION

Media retention screens allow the passage of fluids but prevent passage of particles greater than a particular size. In some industrial processes, it is desirable to have media retention screens which can carry very high loads. These are typically required at the bottom of a down flow reactor. Steel plates, usually stainless steel plates, are used for this purpose. However, provision must be made for processed fluids to flow through the steel plate and this is most typically done by installing a number of screen nozzles uniformly across the plate. These are usually attached to the plate with threaded end fittings known as nipples, and are typically cylindrical and about 50 mm in diameter. The cylindrical surface of the nozzle defines a series of openings which allow liquids to pass but prevent the flow of particles having a diameter greater than the narrowest part of the slot opening. In one known design, the cylindrical surface defining the openings is formed by a stack of stainless steel rings having a triangular cross section known as screen element, sandwiched between a bottom cover and a top cover both of which are welded to the screen element. A stainless steel threaded nipple is welded to the bottom cover and the screen element is fixed to the steel plate by screwing the nipple into a correspondingly threaded aperture in the steel plate.

There are a number of problems with existing screen nozzles, the first of which arises because the plate and the screen nozzle are both made of stainless steel since they need to be corrosion resistant. Because both the nozzles and plate are made of stainless steel, the nozzles tend to bind to the steel plate and once attached to the steel plate are very difficult to remove. This is a problem as the screen nozzle may be filtering corrosive materials which may result in damage to the screen necessitating replacement of the nozzle. Also, screen nozzles are often cleaned by back flushing with acid. Again this can damage the nozzle even though it is made of stainless steel. The welds on the exterior of the steel nozzle are also a particular area of weakness and often corrode after time. Further, the act of welding the plates to the screen, may also partially block the screen and distort the apertures in the screen.

It is an object of the present invention to provide an improved screen nozzle which addresses and attempts to alleviate at least some of the problems of the prior art screen nozzles discussed above.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

According to the present invention, there is provided a screen nozzle, comprising:
a nipple;
a bottom cover;
a top cover; and
a cylindrical screen element sandwiched between the top and bottom covers,
characterised in that the top cover is secured to the bottom cover by means of a threaded rod extending from either the bottom cover or the nipple through the interior of the screen through an aperture in the top cover with the top cover being retained by a nut or the like.

Preferably, the nipple is secured to the bottom cover by swaging.

The threaded rod may be welded to the bottom cover or to the nipple.

Assembling the screen element using an internal threaded rod has two substantial advantages over existing screen nozzles. The first advantage is that there are no external welds which as discussed above, may damage or deform or foul the screen and which are also are potential areas of weaknesses which may be subject to corrosion.

The second advantage is that the screen element may be replaced without removing the nozzle from the screen plate. This makes repair and replacement of the screen nozzles considerably easier and slightly cheaper, since the nipple does not need to be replaced.

BRIEF DESCRIPTION OF THE DRAWINGS

Specific embodiments of the present invention will now be described, by way of example only, and with reference to the accompanying drawings, in which:

FIG. 4 is a section on IV-IV of the screen nozzle of FIG. 3, when inserted in a media retention screen.

DETAILED DESCRIPTION OF A PREFERRED EMBODIMENT

Figure 2:
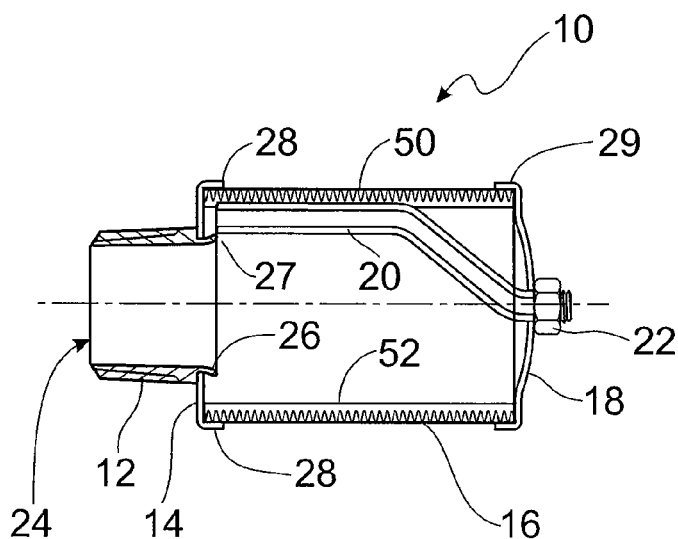
FIG. 2 is a section on II-II of FIG. 1.

Referring to the drawings, a screen nozzle 10 embodying the present invention comprises a means for fixing the screen element to a media retention screen in the form of a threaded nipple having an annular cross section 12, a first plate element in the form of a bottom cover 14, a screen element 16, a second plate element in the form of a top cover 18, a threaded rod 20, and a retention means in the form of a nut 22.

All components are made of stainless steel. The nipple is externally threaded with a thread that matches a correspondingly threaded aperture in a plate for insertion of one end 24 of the nipple into a plate of a media retention screen 25. The other end of the nipple defines an annular end portion 26 of much reduced wall thickness compared to the main body of the nipple. The bottom cover 14 is in the form of a circular plate defining a central circular aperture 27 and an external rib 28. The end portion 26 of the nipple is swaged to engage the nipple in the central aperture 27 of the end cover. As shown in the drawings, the threaded rod 20 which has a "dog leg" bent portion is welded to the end portion 26 of the nipple.

Figure 5:
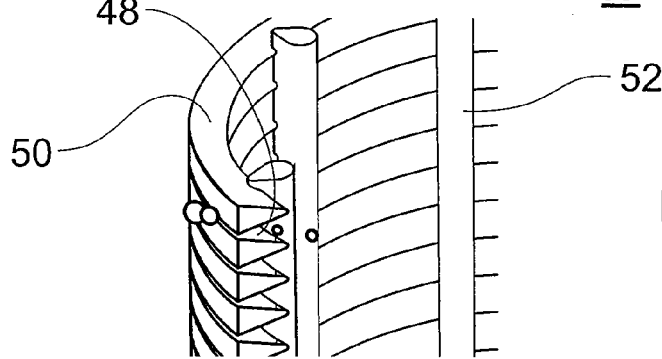
FIG. 5 illustrates the use of triangular wires to form a screen element of the nozzle.

The screen element 16 as shown is generally cylindrical and defines a series of narrow screen openings 48 sized to prevent the passage of particles of greater than a pre-determined diameter. Typically the nozzle's screen openings are 0.2 mm wide at their narrowest. As illustrated in FIG. 5, the openings 48 are made from a series of superposed circular rings 50 formed from wires having a triangular cross-section welded to support rods 52. The openings formed by the superposed rings are v-shaped and allow only two point contact with particles and are thus plug resistant.

The screen element is sandwiched between the bottom plate 14 and the top plate 18. The top plate is saucer shaped and defines a peripheral flange or rib 29. The screen element is retained between the top and bottom plates by means of the threaded rod 20 which extends through an aperture 30 in the centre of the top plate and secured by the nut. 22 and the ribs 28, 29. Removal of the nut allows removal of the top cover 18 and screen from the bottom plate 14.

Figure 1:
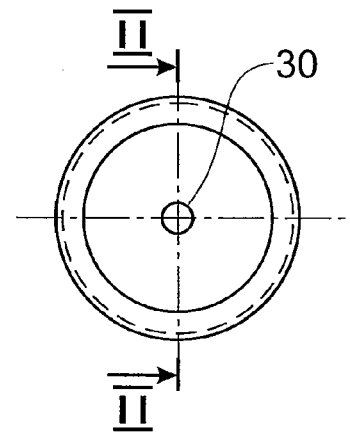
FIG. 1 is a top plan view of a first embodiment of a screen nozzle.
Figure 3:
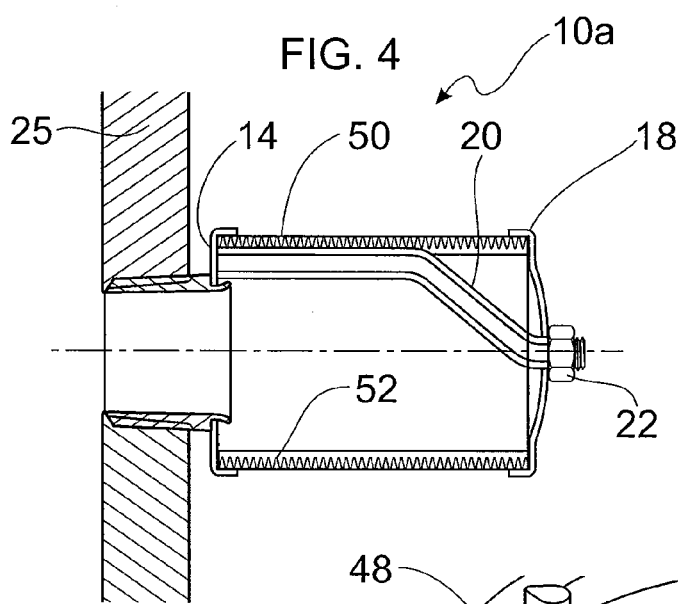
FIG. 3 is a plan view of a second embodiment of a screen nozzle.

FIGS. 3 and 4 show a variant 10a of the screen nozzle shown in FIGS. 1 and 2 in which the threaded rod 20 is welded to the bottom cover 14 rather than to the nipple. Components which are present also in the screen nozzle of FIG. 1 share the same reference numbers. FIG. 4 shows the nozzle screwed into a threaded hole in a plate 25 of a media retention screen. It will be appreciated that in practice the media retention screen will define a plurality of internally threaded apertures for receiving a plurality of nozzles.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A screen nozzle for a media retention screen, including:
a first plate;
a second plate defining an aperture;
a screen element sandwiched between the first and second plates, and
a means for attaching the screen nozzle to the media retention screen, wherein the screen element is retained between the first and second plates by means of a rod extending through the interior of the screen element and through the aperture in the second plate with the second plate being retained on the rod by means of a removable retaining means.

2. The screen nozzle as claimed in claim 1, wherein first plate is a bottom cover which defines a central aperture, and the means for fixing the screen nozzle to the media retention screen comprise a nipple which is secured to the bottom cover by swaging.

3. The screen nozzle as claimed in claim 1, wherein the rod is welded to the bottom cover.

4. The screen nozzle as claimed in claim 1, wherein the rod is welded to the nipple.

5. The screen nozzle as claimed in claim 1, wherein the rod is externally threaded and the retaining means is a nut.

6. A screen nozzle, comprising:
a nipple;
a bottom cover;
a top cover; and
a cylindrical screen element sandwiched between the top and bottom covers, wherein the top cover is secured to the bottom cover by means of a threaded rod extending from either the bottom cover or the nipple through the interior of the screen and through an aperture in the top cover with the top cover being retained by a nut or the like.

7. The screen nozzle as claimed in claim 6, wherein the threaded rod is welded to the bottom cover.

8. The screen nozzle as claimed in claim 6, wherein the threaded rod is welded to the nipple.

9. A media retention screen comprising:
a retention plate defining a plurality of openings; and
a plurality of screen nozzles, said screen nozzles including:
a first plate element;
a second plate element defining an aperture; and
a screen element sandwiched between the first and second plate elements, and wherein a said screen nozzle is attached over each opening in the media retention screen, and wherein the screen element is retained between the first and second plate elements by means of a rod extending through the interior of the screen element and through the aperture in the second plate element with the second plate element being retained on the rod by means of a removable retaining means.

10. The media retention screen as claimed in claim 9, wherein the first plate element is a bottom cover which defines a central aperture, wherein the openings in the retention plate are threaded and the means for fixing the screen nozzle to the media retention screen comprise a threaded nipple.

11. The media retention screen as claimed in claim 9, wherein the rod is welded to the bottom cover.

12. The media retention screen as claimed in claim 11, wherein the rod is externally threaded and the retaining means is a nut.

13. The media retention screen as claimed in claim 9, wherein the rod is welded to the nipple.

14. The media retention screen as claimed in claim 13, wherein the rod is externally threaded and the retaining means is a nut.

15. The media retention screen as claimed in claim 9, wherein the rod is externally threaded and the retaining means is a nut.

* * * * *